United States Patent
Xu et al.

(10) Patent No.: US 10,757,747 B2
(45) Date of Patent: Aug. 25, 2020

(54) METHOD FOR TRANSMITTING DOWNLINK DATA, BASE STATION AND USER EQUIPMENT

(71) Applicant: CHINA ACADEMY OF TELECOMMUNICATIONS TECHNOLOGY, Beijing (CN)

(72) Inventors: Fangli Xu, Beijing (CN); Jing Liang, Beijing (CN); Chandrika Kumudinie Worrall, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/090,133

(22) PCT Filed: Mar. 14, 2017

(86) PCT No.: PCT/CN2017/076563
§ 371 (c)(1),
(2) Date: Sep. 28, 2018

(87) PCT Pub. No.: WO2017/167008
PCT Pub. Date: Oct. 5, 2017

(65) Prior Publication Data
US 2019/0116628 A1    Apr. 18, 2019

(30) Foreign Application Priority Data
Apr. 1, 2016 (CN) .......................... 2016 1 0204599

(51) Int. Cl.
*H04W 72/14* (2009.01)
*H04W 76/20* (2018.01)
*H04W 68/00* (2009.01)

(52) U.S. Cl.
CPC ........... *H04W 76/20* (2018.02); *H04W 68/00* (2013.01); *H04W 68/005* (2013.01); *H04W 72/14* (2013.01)

(58) Field of Classification Search
CPC ... H04W 76/20; H04W 68/005; H04W 72/14; H04L 25/0226; H04L 5/1469
See application file for complete search history.

(56) References Cited

U.S. PATENT DOCUMENTS

2010/0272004 A1* 10/2010 Maeda .................. H04L 5/0007
370/312
2014/0016614 A1* 1/2014 Velev ...................... H04W 4/70
370/331

(Continued)

FOREIGN PATENT DOCUMENTS

| CN | 103517416 A | 1/2014 |
| CN | 103581888 A | 2/2014 |

(Continued)

OTHER PUBLICATIONS

First Office Action and search report from Cn app. No. 201610204599.X, dated Dec. 28, 2018, with English translation from Global Dossier.

(Continued)

*Primary Examiner* — Wei Zhao
(74) *Attorney, Agent, or Firm* — Ladas & Parry, LLP (57) ABSTRACT

A method for transmitting downlink data, a base station and a user equipment are provided. The method includes: generating, by a base station, on reception of downlink traffic data sent by a core network to a user equipment in a light connection state, a triggering message based on an identifier of the user equipment in the light connection state; and controlling, based on the triggering message, the user equipment in the LC state to recover to a connection state.

(Continued)

Furthermore, the downlink traffic data may be sent to the user equipment which has been restored to the connection state.

15 Claims, 4 Drawing Sheets

(56) References Cited

U.S. PATENT DOCUMENTS

| | | |
|---|---|---|
| 2015/0195788 A1 | 7/2015 | Kelvin et al. |
| 2015/0257173 A1* | 9/2015 | You .................. H04L 1/1864 370/330 |

FOREIGN PATENT DOCUMENTS

| | | |
|---|---|---|
| CN | 104754759 A | 7/2015 |
| CN | 105657861 A | 6/2016 |
| EP | 3432654 A1 | 1/2019 |
| EP | 3562227 A1 | 10/2019 |
| WO | 2015105846 A1 | 7/2015 |

OTHER PUBLICATIONS

"Motivation for new WI on Light Connection in LTE", 3GPP TSG RAN Meeting #71, Goteborg, Sweden, Mar. 7-11, 2016.

International Preliminary Report on Patentability from PCT/CN2017/076563, dated Oct. 2, 2018, with English translation from WIPO.

Written Opinion of the International Searching Authority from PCT/CN2017/076563, dated May 31, 2017, with English translation from WIPO.

International Search Report for PCT/CN2017/076563 dated May 31, 2017 and its English translation provided by WIPO.

Written Opinion of the International Search Authority PCT/CN2017/076563 dated May 31, 2017 and its English translation provided by Google Translate.

Huawei et al., "Motivation for New WI on Light Connection in LTE", 3GPP TSG RAN Meeting #71 RP-160301, Mar. 11, 2016 (Mar. 11, 2016), pp. 4-11.

Intel Corporation, "Further Enhancements on Signalling Reduction to Enable Light Connection for LTE", 3GPP TSG RAN Meeting #71 RP-160425, Mar. 10, 2016 (Mar. 10, 2016), the whole document.

Communication pursuant to Article 94(e) EPC from EP app. No. 17773039.7, dated Jan. 29, 2020.

* cited by examiner

METHOD FOR TRANSMITTING DOWNLINK DATA, BASE STATION AND USER EQUIPMENT

CROSS-REFERENCE TO RELATED APPLICATIONS

This application is the U.S. national phase of PCT Application PCT/CN2017/076563 filed on Mar. 14, 2017 which claims the priority to Chinese Patent Application No. 201610204599.X filed on Apr. 1, 2016 the disclosures of which are incorporated herein by reference in their entireties.

TECHNICAL FIELD

The present disclosure relates to the technical field of communications, and in particular to a method for transmitting downlink data, a base station and a user equipment.

BACKGROUND

In a 4G network of related technology, when a user is in an idle state and there exists downlink traffic data to be sent to the user, a core network initiate a paging process directly. When the user is in a connection state and a network side has downlink traffic data to send, the core network may send the data via a user equipment (User Equipment, UE) specific bearer to an evolved node B (evolved Node B, eNB) to which a UE belongs, and then the eNB may send the data to the user through a downlink dedicated data scheduling transmission. In a light connection state, the core network sends the downlink traffic data to a base station to which the core network considers the UE belongs; however, the user equipment may not be accessing to the base station and consequently the network side can not send the data to the UE through a dedicated data downlink scheduling transmission.

Figure 1:
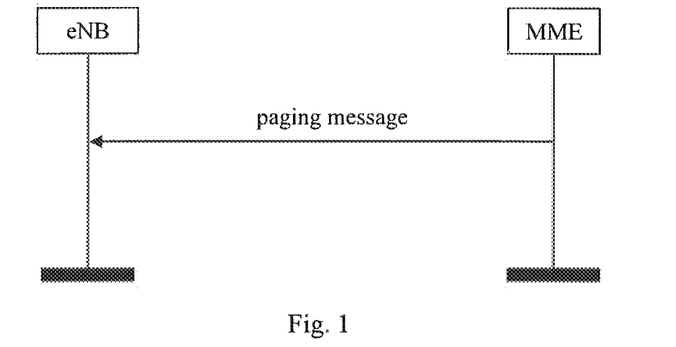
FIG. 1 shows a flow of a core network triggering a paging message and sending the paging message based on information of the core network in related technology.

As shown in FIG. 1, a current paging mechanism of long term evolution (Long Term Evolution, LTE) mainly has two functions: (1) the core network pages a specific user, (2) the core network initiates a paging when announcing system information updating or information of emergency turnaround warning system/commercial mobile alert system (Emergency Turnaround Warning System/Commercial Mobile Alert System, ETWS/CMAS) and so on.

Specifically, (1) indicates a paging for a specific user. The paging is triggered by the core network and its procedure is described as follows.

When the core network searches for a UE in the idle state, a paging process for the UE is triggered directly by a mobility management entity (Mobility Management Entity, MME) and a paging message is sent to an eNB via an SI interface. The eNB calculates, based on information in the paging message, a time instant at which the UE receives the paging message, organize a paging message of an air interface based on a paging content at the SI interface, and sends the paging message to the UE at an air interface paging time instant.

In related technology, when user downlink traffic data arrives, the core network may not trigger a paging process for a user equipment in the connection state; and the core network sends the relevant downlink traffic data to a corresponding base station via a dedicated bearer. For a user equipment in the light connection state, there exist few approaches for the network side to find the UE.

SUMMARY

The present disclosure is to provide a method for transmitting downlink data, a base station and a user equipment, to find a user equipment in a light connection state and send downlink traffic data to the user equipment recovered to a connection state.

In view of the above, the present disclosure provides in some embodiments a method for transmitting downlink data, including: generating, by a base station, on reception of downlink traffic data sent by a core network to a user equipment in a light connection (LC) state, a triggering message based on an identifier of the user equipment in the LC state; and controlling, by the base station, based on the triggering message, the user equipment in the LC state to recover to a connection state.

Optionally, the step of generating the triggering message based on the identifier of the user equipment in the LC state includes: generating, based on the identifier of the user equipment in the LC state, an enhanced paging message including the identifier of the user equipment in the LC state; or generating downlink control channel information based on the identifier of the user equipment in the LC state.

Optionally, the step of generating, based on the identifier of the user equipment in the LC state, the enhanced paging message including the identifier of the user equipment in the LC state includes: generating the enhanced paging message by carrying the identifier of the user equipment in the LC state in a downlink control channel or in a downlink shared channel.

Optionally, the step of generating the enhanced paging message by carrying the identifier of the user equipment in the LC state in the downlink control channel includes: taking the identifier of the user equipment in the LC state as a content of the downlink control channel, and scrambling the content of the downlink control channel using a preset scramble code, to generate the enhanced paging message; or scrambling the downlink control channel using the identifier of the user equipment in the LC state as a scramble code, to generate the enhanced paging message.

Optionally, the step of generating the enhanced paging message by carrying the identifier of the user equipment in the LC state in the downlink shared channel includes: taking the identifier of the user equipment in the LC state as a content of the downlink shared channel, scrambling a downlink control channel using a preset scramble code, and performing a scheduling through the scrambled downlink control channel, to generate the enhanced paging message.

Optionally, the enhanced paging message comprises an identifier of at least one user equipment in the LC state.

Optionally, after the step of controlling, based on the triggering message, the user equipment in the LC state to recover to the connection state, the method for transmitting the downlink data further includes: sending, by the base station, the downlink traffic data to the user equipment recovered to the connection state.

Optionally, the step of generating the downlink control channel information based on the identifier of the user equipment in the LC state comprises: generating a downlink control channel message by scrambling a downlink control channel using a preset scramble code.

Optionally, at the same time as or after the step of controlling, based on the triggering message, the user equipment in the LC state to recover to a connection state, the method for transmitting the downlink data further includes: sending, by the base station, the downlink traffic data to the user equipment recovered to the connection state.

Optionally, the step of controlling, based on the triggering message, the user equipment in the LC state to recover to a connection state includes: sending the triggering message to the user equipment in the LC state through a downlink control channel, to recover the user equipment in the LC state from the LC state to the connection state.

Optionally, the step of sending the triggering message to the user equipment in the LC state through the downlink control channel includes: sending the triggering message to the user equipment in the LC state through the downlink control channel in the shorter of a configured user equipment specific discontinuous reception (DRX) cycle and a DRX cycle included in a system broadcast; or sending the triggering message to the user equipment in the LC state through the downlink control channel in a DRX cycle included in a system broadcast; or sending the triggering message to the user equipment in the LC state through the downlink control channel in a configured user equipment specific DRX cycle.

Optionally, the identifier of the user equipment in the LC state is configured by: configuring a user equipment identifier for the user equipment in the LC state, when the base station configures the user equipment to enter the LC state; or reconfiguring a user equipment identifier for the user equipment in the LC state, when the user equipment in the LC state moves from a first cell region to a second cell region. Each of the first cell region and the second cell region includes at least one cell.

The present disclosure further provides in some embodiments a method for transmitting downlink data, including: receiving, a triggering message that is generated by a base station when the base station receives downlink data from a core network; and recovering from a light connection (LC) state to a connection state according to the triggering message.

Optionally, the step of recovering from the LC state to the connection state according to the triggering message includes: determining, based on an enhanced paging message that includes an identifier of a user equipment in the LC state and is generated by the base station on reception of the downlink traffic data from the core network, that the identifier of the user equipment in the enhanced paging message is the same as a stored identifier of the user equipment, initiating an air interface connection directly, to recover from the LC state to the connection state; or recovering from the LC state to the connection state automatically based on downlink control channel information sent by the base station.

Optionally, after the recovering of the user equipment from the LC state to the connection state, the method for transmitting the downlink data further includes: receiving, in the connection state, the downlink traffic data sent by the base station.

The present disclosure further provides in some embodiments a base station, including: a triggering module, configured to generate, on reception of downlink traffic data sent by a core network to a user equipment in a light connection (LC) state, a triggering message based on an identifier of the user equipment in the LC state; and a sending module, configured to control, based on the triggering message, the user equipment in the LC state to recover to a connection state.

Optionally, the triggering module includes: a first triggering unit, configured to generate, based on the identifier of the user equipment in the LC state, an enhanced paging message including the identifier of the user equipment in the LC state; or a second triggering unit, configured to generate, based on the identifier of the user equipment in the LC state, downlink control channel information.

Optionally, the first triggering unit is configured to generate the enhanced paging message by carrying the identifier of the user equipment in the LC state in a downlink control channel or in a downlink shared channel.

Optionally, the first triggering unit includes: a first triggering sub-unit, configured to take the identifier of the user equipment in the LC state as a content of the downlink control channel and scramble the content of the downlink control channel using a preset scramble code, to generate the enhanced paging message; or a second triggering sub-unit, configured to scramble the downlink control channel using the identifier of the user equipment in the LC state as a scramble code, to generate the enhanced paging message; or a third triggering sub-unit, configured to take the identifier of the user equipment in the LC state as a content of the downlink shared channel, scramble a downlink control channel using a preset scramble code, and perform a scheduling through the scrambled downlink control channel, to generate the enhanced paging message.

Optionally, the enhanced paging message includes an identifier of at least one user equipment in the LC state.

Optionally, the second triggering unit is configured to generate a downlink control channel message by scrambling a downlink control channel using a preset scramble code.

Optionally, the sending module is configured to send the triggering message to the user equipment in the LC state through a downlink control channel to recover the user equipment in the LC state from the LC state to the connection state.

Optionally, the sending module is configured to: send the triggering message to the user equipment in the LC state through the downlink control channel in the shorter of a configured user equipment specific discontinuous reception (DRX) cycle and a DRX cycle included in a system broadcast; or send the triggering message to the user equipment in the LC state through the downlink control channel in a DRX cycle included in a system broadcast; or send the triggering message to the user equipment in the LC state through the downlink control channel in a configured user equipment specific DRX cycle.

Optionally, the identifier of the user equipment in the LC state is configured by: configuring a user equipment identifier for the user equipment in the LC state, when the base station configures the user equipment to enter the LC state; or reconfiguring a user equipment identifier for the user equipment in the LC state, when the user equipment in the LC state moves from a first cell region to a second cell region. Each of the first cell region and the second cell region includes at least one cell.

Optionally, the sending module is further configured to send the downlink traffic data to the user equipment recovered to the connection state.

The present disclosure further provides in some embodiments a user equipment, including: a receiving module, configured to receive, a triggering message that is generated by a base station when the base station receives downlink traffic data from a core network; and a recovering module, configured to recover from a light connection (LC) state to a connection state according to the triggering message.

Optionally, the recovering module includes: a first recovering unit, configured to determine that an identifier of a user equipment included in an enhanced paging message is the same as a stored identifier of the user equipment, based on the enhanced paging message that includes the identifier of the user equipment in the LC state and is generated by the base station on reception of the downlink traffic data from the core network, initiate an air interface connection directly, to recover from the LC state to the connection state; or a second recovering unit, configured to recover from the LC state to the connection state automatically based on downlink control channel information sent by the base station.

Optionally, the receiving module is further configured to receive, in the connection state, the downlink traffic data sent by the base station.

The present disclosure further provides in some embodiments a base station, including a processor, a memory and a transceiver. The processor is configured to read a program in the memory to perform a process of: generating, on reception of downlink traffic data sent by a core network to a user equipment in a light connection (LC) state, a triggering message based on an identifier of the user equipment in the LC state; and controlling, based on the triggering message, the user equipment in the LC state to recover to a connection state. The transceiver is configured to receive and transmit data. The processor is further configured to manage a bus architecture and common processings. The memory is configured to store data used by the processor in operation.

The present disclosure further provides in some embodiments a user equipment, including a processor, a memory and a transceiver. The processor is configured to read a program in the memory to perform a process of: receiving, via the transceiver, a triggering message that is generated by a base station when the base station receives downlink traffic data from a core network; and recovering from a light connection (LC) state to a connection state according to the triggering message. The transceiver is configured to receive and transmit data. The processor is further configured to manage a bus architecture and common processings. The memory is configured to store data used by the processor in operation.

Beneficial effects of the embodiments of the present disclosure are described as follows. In the above technical solutions, the base station generates the triggering message, based on the identifier of the user equipment in the LC state on reception of the downlink traffic data sent by the core network to the user equipment in the LC state, and the base station controls the user equipment in LC state to recover to the connection state based on the triggering message. Hence, the user equipment in the LC state can be found, and the downlink traffic data can be further sent to the user equipment recovered to the connection state.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person ordinary skilled in the art can obtain other drawings based on the described drawings without any creative efforts. The drawings are not presented in a uniform scale based on actual sizes and they focus on showing the substance of the present disclosure.

DETAILED DESCRIPTION

To better clarify object, technical solutions and advantages of embodiments of the present disclosure, the technical solutions in the embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

To address an issue in related technology that a network side can not find a user equipment in a light connection state, the present disclosure provides a method for transmitting downlink data, a base station and a user equipment. On reception of downlink traffic data sent by a core network to a user equipment in a light connection state, a base station searches for a user in the light connection state by generating a triggering message at an air interface, such as, by including a UE ID in a downlink control channel or in a downlink scheduling, and turns the user equipment in the light connection state into a connection state. Hence, the network can find the user equipment in the light connection state and transmit the downlink traffic data to the user equipment recovered to a connection state.

Figure 2:
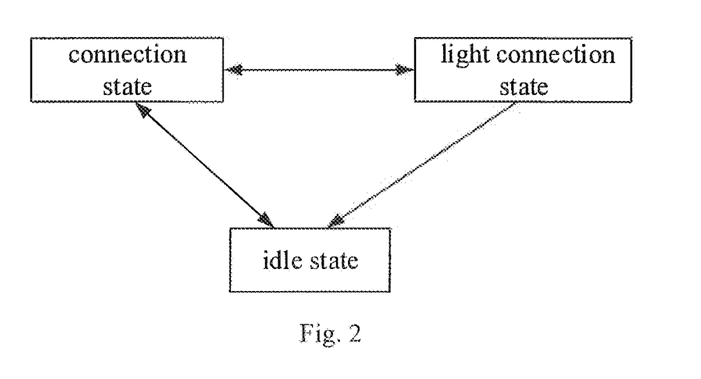
FIG. 2 is a schematic diagram of transitions among three states of a UE.

FIG. 2 schematically shows transitions among three states of a UE. In an LTE system, the UE has two kinds of radio resource control (Radio Resource Control, RRC) states, i.e., an RRC_connected state and an RRC_idle state. Due to mobility management performed by a network on the UE and data transceiving of the UE, lots of signalings may be utilized. To save signaling overhead of the air interface, a new RRC state is introduced into LTE R14, which is called as a light connection (Light Connection, LC) state. When the UE is in the LC state, the UE can not transmit or receives data but can receive a paging.

Figure 3:
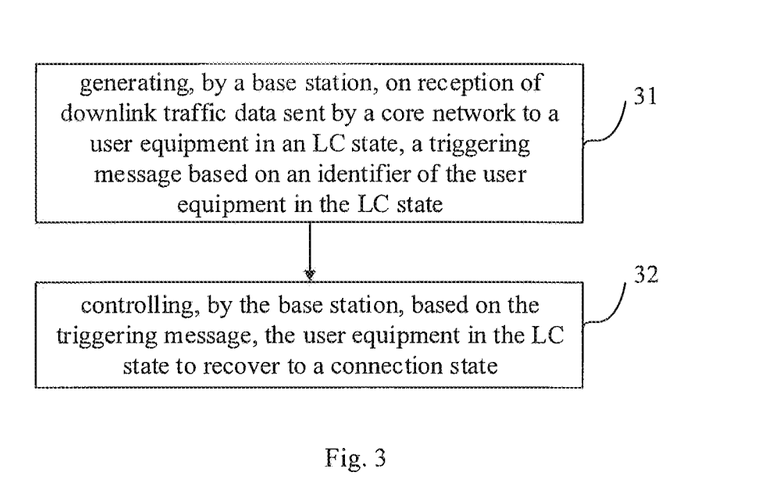
FIG. 3 is a first flow chart of a method for transmitting downlink data at a base station side according to the present disclosure.

FIG. 3 shows a method for transmitting downlink data according to some embodiments of the present disclosure. As shown in FIG. 3, the method for transmitting the downlink data includes steps 31 to 32. In step 31, a base station generates, on reception of downlink traffic data sent by a core network to a user equipment in an LC state, a triggering message based on an identifier of the user equipment in the LC state. In step 32, the user equipment in the LC state is controlled, based on the triggering message, to recover to a connection state.

In some embodiments, on reception of the downlink traffic date from the core network, the base station generates the triggering message based on a user equipment identifier which is saved locally or from the user equipment, to recover the user equipment in the LC state to the connection state, such that the network side can find the user equipment in the LC state and the downlink traffic data can be further sent to the user equipment in the LC state.

Figure 4:
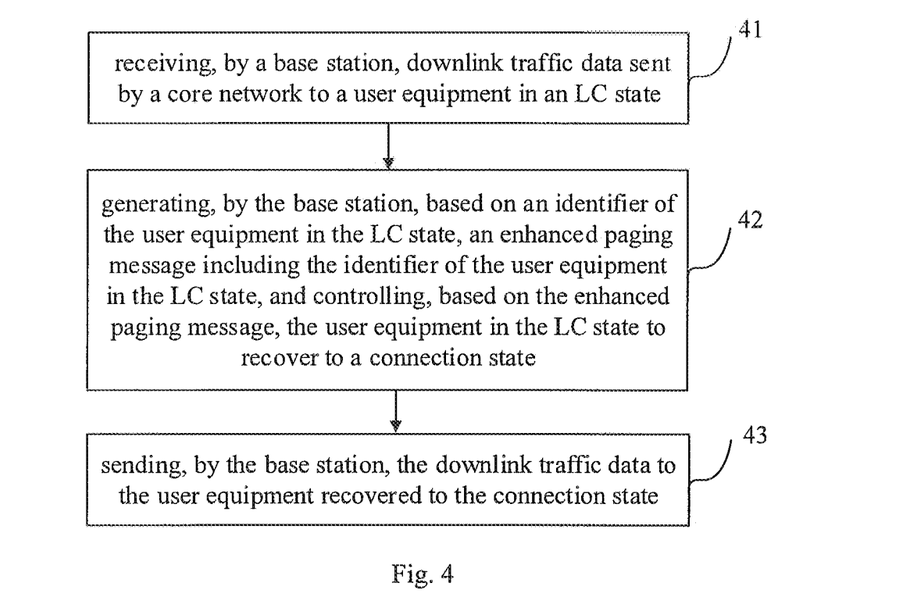
FIG. 4 is a second flow chart of a method for transmitting downlink data at a base station side according to the present disclosure.

FIG. 4 shows a method for transmitting downlink data according to some embodiments of the present disclosure. As shown in FIG. 4, the method for transmitting the downlink data includes steps 41 to 43. In step 41, a base station receives, downlink traffic data sent by a core network to a user equipment in an LC state. In step 42, the base station generates, based on an identifier of the user equipment in the LC state, an enhanced paging message including the identifier of the user equipment in the LC state, and controls, based on the enhanced paging message, the user equipment in the LC state to recover to a connection state. In step 43, the base station sends the downlink traffic data to the user equipment recovered to the connection state.

In some embodiments, step 42 may have the following two implementations.

In a first implementation, i.e., in step 4211, the base station carries the identifier of the user equipment in the LC state in a downlink control channel to generate the enhanced paging message, and sends the enhanced paging message to the user equipment in the LC state to recover the user equipment in the LC state from the LC state to the connection state based on the enhanced paging message.

Specifically, step 4211 may include step 42111. In step 42111, the base station takes the identifier of the user equipment (UE ID) in the LC state as a content of a physical downlink control channel (PDCCH), scrambles the content of the downlink control channel using a preset scramble code (such as a paging radio network temporary identifier (Paging Radio Network Temporary Identifier, P-RNTI) or a newly introduced Group P-RNTI) to generate the enhanced paging message, and sends the enhanced paging message to the user equipment in the LC state.

Figure 5:
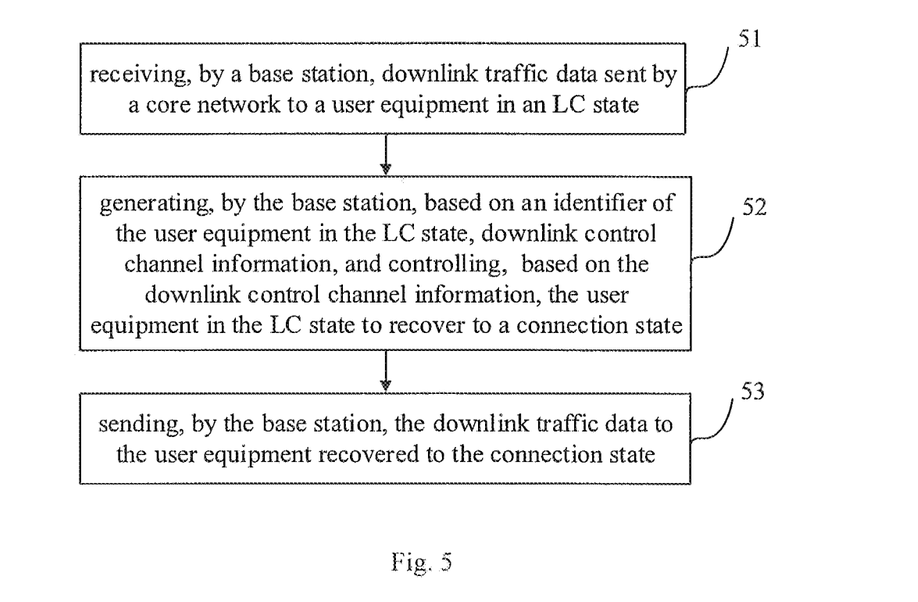
FIG. 5 is a third flow chart of a method for transmitting downlink data at a base station side according to the present disclosure.

As shown in FIG. 5, detailed signalings are described as follows.

(1) The eNB receives downlink traffic data sent by the core network (Core Network, CN) to the LC UE and determines a moving range of the UE.

(2) The eNB notifies all related cells in the moving range to send the enhanced paging message for the UE based on a configured discontinuous reception (Discontinuous Reception, DRX) for receiving the enhanced paging message.

(3) When the UE enters the LC state, the eNB configures a Group P-RNTI of the UE for receiving the enhanced paging message while configuring the UE ID of the LC UE, where the Group P-RNTI may be dedicated for a cell group rather than dedicated for the UE.

(4) When sending the enhanced paging message, the base station takes information of the UE ID as the content of the PDCCH and scrambles using the Group P-RNTI.

(5) The UE descrambles received PDCCH using the Group P-RNTI, and submits the UE ID to an RRC if the UE ID is carried in the PDCCH; if the UE ID is carried in a physical downlink shared channel (Physical Downlink Shared Channel, PDSCH), the PDSCH is descrambled and the UE ID carried in the PDSCH is submitted to the RRC.

(6) The RRC determines whether the UE ID matches a stored UE ID, if they match, a connection recovery process in initiated in a current cell and the connection state is entered.

The DRX have three configurations:

(1) sending the enhanced paging message to the user equipment in the LC state in the shorter of a configured UE specific DRX (UE Specific DRX) cycle and a DRX cycle included in a system broadcast; or (2) sending the enhanced paging message to the user equipment in the LC state in a DRX cycle included in a system broadcast; or (3) sending the enhanced paging message to the user equipment in the LC state in a configured UE specific DRX cycle.

In another implementation of step 4211, i.e., step 42112, the base station scrambles the downlink control channel by using the identifier of the user equipment in the LC state as a scramble code to generate the enhanced paging message and sends the enhanced paging message to the user equipment in the LC state.

Figure 6:
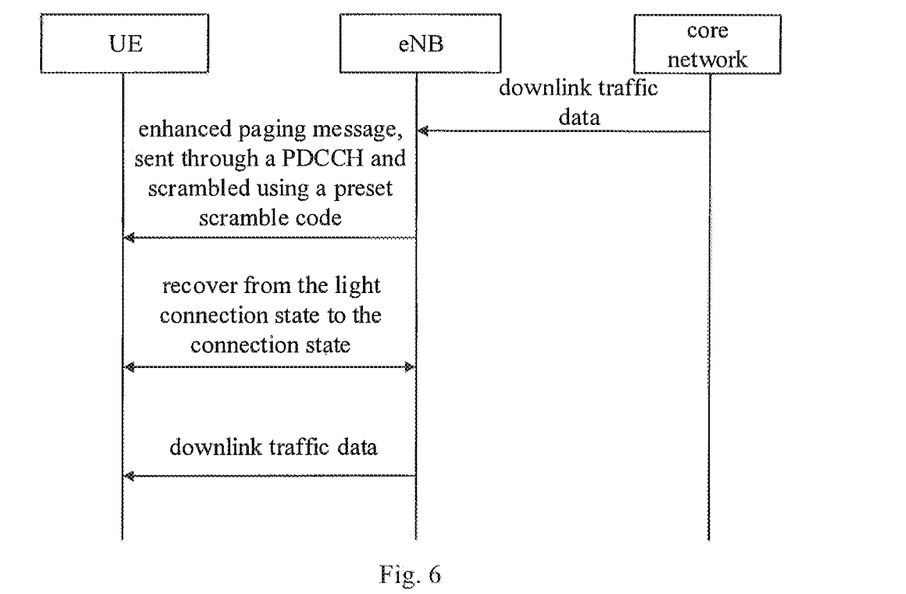
FIG. 6 is a first signaling flow chart of sending an enhanced paging message in the method shown in FIG. 4.
Figure 7:
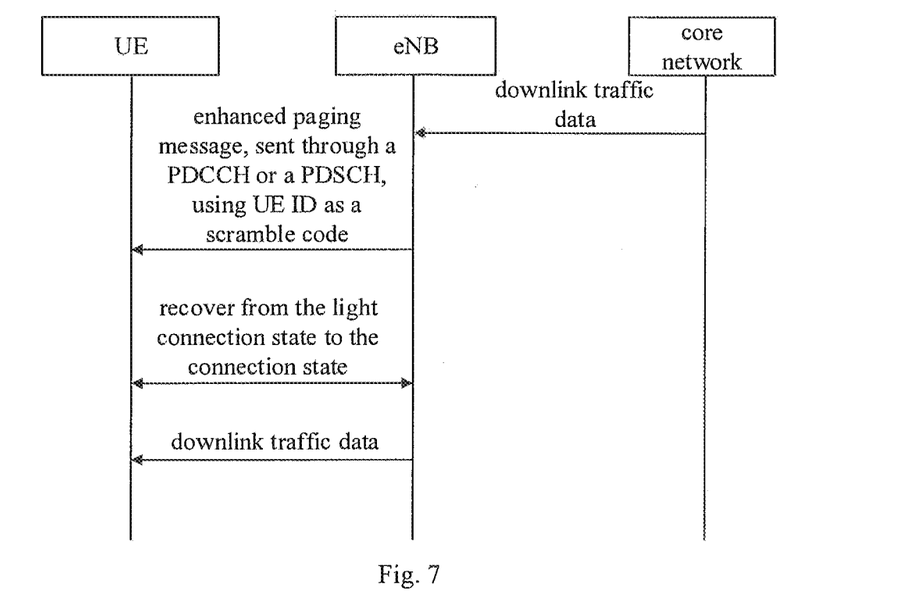
FIG. 7 is a second signaling flow chart of sending an enhanced paging message in the method shown in FIG. 4.

As shown in FIG. 6, the UE ID is used as the scramble code to scramble the downlink control channel and detailed signalings are described as follows.

(1) The eNB sends the PDCCH scrambled using the UE ID to the UE.

(2) The UE receives the PDCCH at a corresponding receiving location and descrambles the PDCCH using the UE ID.

(3) After successful descrambling, the information is sent to an RRC in the UE and the RRC directly initiates a connection recovery process in a current cell to which the UE belongs.

In a second implementation, i.e., in step 4212, the base station carries the identifier of the user equipment (UE ID) in the LC state in a PDSCH to generate an enhanced paging message, and sends the enhanced paging message to the user equipment in the LC state, to recover the user equipment in the LC state from the LC state to a connection state based on the enhanced paging message.

In an implementation of step 4212, i.e., in step 42121, the base station takes the UE ID as a content of the PDSCH based on the downlink traffic data, scrambles the downlink control channel using a preset scramble code, and performs a scheduling through the scrambled downlink control channel, to generate the enhanced paging message, and sends the enhanced paging message to the user equipment in the LC state. That is, the UE ID is carried in the PDSCH and the scheduling is performed through the downlink control channel scrambled by the P-RNTI.

In the above embodiments, the enhanced paging message may be sent to the user equipment in the LC state in the short of a configured UE specific DRX cycle and a DRX cycle included in a system broadcast; or the enhanced paging message may be sent to the user equipment in the LC state in a DRX cycle included in a system broadcast; or the enhanced paging message may be sent to the user equipment in the LC state in a configured UE specific DRX cycle.

In the above embodiments, the enhanced paging message includes an identifier of at least one user equipment in the LC state. The identifier of the at least one user equipment may be multiple UEs in one moving cell group or multiple UEs in multiple moving cell groups.

FIG. 5 shows a method for transmitting downlink data according to some embodiments of the present disclosure. As shown in FIG. 5, the method for transmitting the downlink data includes steps 51 to 53. In step 51, a base station receives downlink traffic data sent by a core network to a user equipment in an LC state. In step 52, the base station generates, based on an identifier of the user equipment in the LC state, downlink control channel information, and controls, based on the downlink control channel information, the user equipment in the LC state to recover to a connection state. In step 53, the base station sends the downlink traffic data to the user equipment recovered to the connection state.

In some embodiments, the downlink traffic data may optionally be sent to the user equipment directly.

Step 52 may include step 5221. In step 5221, the base station scrambles the downlink control channel using a preset scramble code and sends the downlink control channel information after the scrambling process to the user equipment in the LC state, to directly recover the user equipment in the LC state to the connection state.

Figure 8:
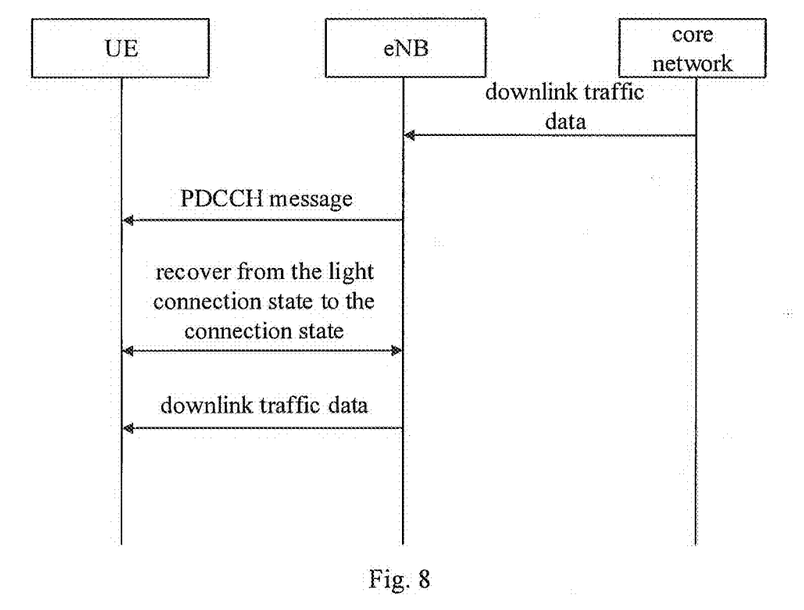
FIG. 8 is a signaling flow chart of sending downlink control channel information and downlink data in the method shown in FIG. 5.

As shown in FIG. 8, detailed signalings are described as follows. The eNB receives downlink traffic data sent by the core network to the LC UE and determines that the UE is within a cell to which it currently belongs; the base station directly sends, based on a DRX location preconfigured for the UE, PDCCH information scrambled by a cell radio network temporary identifier (Cell Radio Network Temporary Identifier, C-RNTI) to the UE, to directly send the downlink traffic data to the UE; and on reception of a PDCCH scheduling, the LC UE receives a corresponding PDSCH downlink traffic data transmission, and recovers to the connection state directly and automatically.

In the above embodiments, the identifier of the user equipment in the LC state may be configured in following ways. When the base station configures the user equipment to enter the LC state, the base station configures a user equipment identifier for the user equipment in the LC state; or when the user equipment in the LC state moves from a first cell region to a second cell region, the base station reconfigures a user equipment identifier for the user equipment in the LC state. Each of the first cell region and the second cell region includes at least one cell.

In the above embodiments of the present disclosure, the base station configures one UE ID for the UE in the LC state, and the UE ID ensures a mobility within a moving range of the LC UE. When the eNB configures the UE to enter the LC state, the eNB also configures one UE ID dedicated for the LC state for the UE. When the LC UE notifies the base station that a moving cell group to which the LC UE belongs changes, the base station reconfigures UE ID information used by the LC UE for the LC UE. The UE ID is unique in a network-permitted moving range, that is, the UE ID is at least unique in one moving cell group. On reception of the downlink traffic data sent by the core network to the LC UE, the base station searches for the LC UE in respective cells within the moving range of the LC UE through the enhanced paging messaging including the UE ID. Hence, the UE can be found in the moving range of the LC UE, when the base station receives the downlink traffic data sent by the core network to the LC UE.

Figure 9:
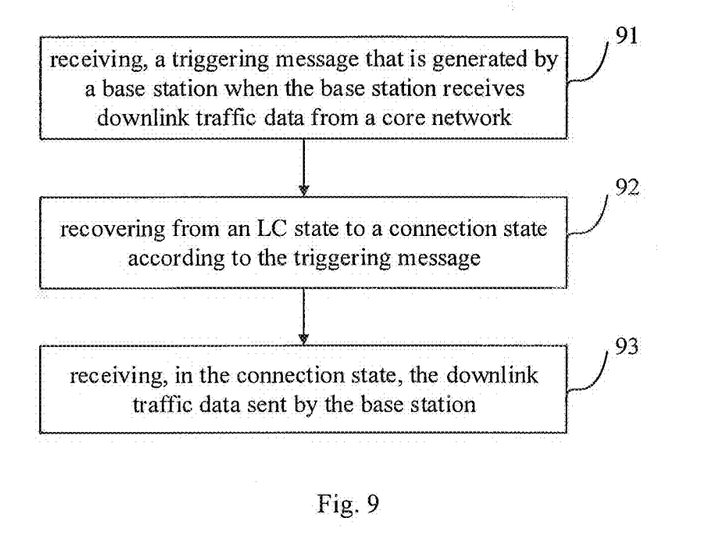
FIG. 9 is a flow chart of a method for transmitting downlink data at a user equipment side according to the present disclosure.

FIG. 9 shows a method for transmitting downlink data according to some embodiments of the present disclosure. As shown in FIG. 9, the method for transmitting the downlink data includes steps 91 to 92. In step 91, a triggering message that is generated by a base station when the base station receives downlink traffic data from a core network is received. In step 92, recovering from an LC state to a connection state is performed according to the triggering message. In addition, the method for transmitting the downlink data may include step 93. In step 93, in the connection state, the downlink traffic data sent by the base station is received.

The embodiments are applied to a user equipment side. A user equipment receives, the triggering message that is generated by the base station when the base station receives the downlink traffic data from the core network, recovers from the LC state to the connection state according to the triggering message, and receives the downlink traffic data sent by the base station in the connection state.

Step 91 may include: receiving the triggering message that is generated by the base station when the base station receives downlink traffic data from the core network, in the shorter of a configured UE specific DRX cycle and a DRX cycle included in a system broadcast; or receiving the triggering message that is generated by the base station when the base station receives downlink traffic data from the core network, in a DRX cycle included in a system broadcast; or receiving the triggering message that is generated by the base station when the base station receives downlink traffic data from the core network, in a configured UE specific DRX cycle.

Step 92 may include: recovering from the LC state to the connection state, based on an enhanced paging message that includes an identifier of the user equipment in the LC state and is generated by the base station on reception of the downlink traffic data; or recovering from the LC state to the connection, state based on downlink control channel information that is generated by the base station based on an identifier of the user equipment.

Step 92 may include the following two implementations. The user equipment determines that the identifier of the user equipment included in the enhanced paging message is the same as a stored identifier of the user equipment, based on the enhanced paging message that includes the identifier of the user equipment in the LC state and is generated by the base station on reception of the downlink traffic data from the core network, initiates an air interface connection directly, to recover from the LC state to the connection state; or the user equipment receives the downlink control channel information sent by the base station and recovers from the LC state to the connection state automatically.

A base station is provided according to some embodiments of the present disclosure. The base station includes a triggering module, configured to generate, on reception of downlink traffic data sent by a core network to a user equipment in an LC state, a triggering message based on an identifier of the user equipment in the LC state; and a sending module, configured to control, based on the triggering message, the user equipment in the LC state to recover to a connection state.

The triggering module includes: a first triggering unit, configured to generate, based on the identifier of the user equipment in the LC state, an enhanced paging message including the identifier of the user equipment in the LC state; or a second triggering unit, configured to generate, based on the identifier of the user equipment in the LC state, downlink control channel information.

The first triggering unit is configured to generate the enhanced paging message by carrying the identifier of the user equipment in the LC state in a downlink control channel or in a downlink shared channel.

The first triggering unit includes: a first triggering subunit, configured to take the identifier of the user equipment in the LC state as a content of the downlink control channel, and scramble the content of the downlink control channel using a preset scramble code, to generate the enhanced paging message; or a second triggering sub-unit, configured to scramble the downlink control channel using the identifier of the user equipment in the LC state as a scramble code, to generate the enhanced paging message; or a third triggering sub-unit, configured to take the identifier of the user equipment in the LC state as a content of the downlink shared channel, scramble a downlink control channel using a preset scramble code, and perform a scheduling through the scrambled downlink control channel, to generate the enhanced paging message.

The enhanced paging message includes an identifier of at least one user equipment in the LC state.

The second triggering unit is configured to generate a downlink control channel message by scrambling a downlink control channel using a preset scramble code.

The sending module is configured to send the triggering message to the user equipment in the LC state through a downlink control channel to recover the user equipment in the LC state from the LC state to the connection state.

The sending module is configured to send the triggering message to the user equipment in the LC state through the downlink control channel in the shorter of a configured UE specific DRX cycle and a DRX cycle included in a system broadcast; or send the triggering message to the user equipment in the LC state through the downlink control channel in a DRX cycle included in a system broadcast; or send the triggering message to the user equipment in the LC state through the downlink control channel in a configured UE specific DRX cycle.

The identifier of the user equipment in the LC state may be configured in the following ways. When the base station configures the user equipment to enter the LC state, the base station configures a user equipment identifier for the user equipment in the LC state; or when the user equipment in the LC state moves from a first cell region to a second cell region, the base station reconfigures a user equipment identifier for the user equipment in the LC state. Each of the first cell region and the second cell region includes at least one cell.

The sending module is further configured to send the downlink traffic data to the user equipment recovered to the connection state.

It should be noted that, embodiments directed to the base station are devices embodiments corresponding to the methods in the embodiments with reference to FIG. 3 and FIG. 4. All the implementations in the method embodiments can be applied to the embodiments directed to the base station and similar technical effects can be achieved.

A user equipment is provided according to some embodiments of the present disclosure. The user equipment includes: a receiving module, configured to receive, a triggering message that is generated by a base station when the base station receives downlink traffic data from a core network; and a recovering module, configured to recover from an LC state to a connection state according to the triggering message.

The recovering module includes: a first recovering unit, configured to determine that an identifier of the user equipment included in an enhanced paging message is the same as a stored identifier of the user equipment, based on the enhanced paging message that includes the identifier of the user equipment in the LC state and is generated by the base station on reception of the downlink traffic data, initiate an air interface connection directly, to recover from the LC state to the connection state; or a second recovering unit, configured to recover from the LC state to the connection state automatically based on downlink control channel information sent by the base station.

The receiving module is further configured to receive, in the connection state, the downlink traffic data sent by the base station.

The basic principle of the present disclosure is described in the above in conjunction with the embodiments. It should be noted that, a person ordinary skilled in the art can understand that all or any steps or components of the method and device in the present disclosure may be implemented with hardware, firmware, software or any combination thereof in any computing device (including a processor and a storage medium and so on) or in a network of computing devices, which can be realized by a person skilled in the art with their basic programming skills on the basis of the present disclosure.

The object of the present disclosure can be achieved through running a program or a group of programs on any computing device. The computing device may be a well-known common device. In addition, the object of the present disclosure can be achieved by a mere program product having program codes for realizing the method or device. That is, such a program product is included in the present disclosure, so is a storage medium storing such a program product thereon. Apparently, the storage medium may be any well-known storage medium or any storage medium developed in the future. It should be further pointed out that, in the device and method of the present disclosure, each component or step can be divided or recombined. The dividing and recombining should be regarded as equivalent solutions of the present disclosure. In addition, the steps in the present disclosure can be performed sequentially according to the described order. It is not required that the steps can only be performed sequentially. Some steps can be performed in parallel or independently.

The above descriptions are merely optional embodiments of the present disclosure. It should be pointed out that, a person ordinary skilled in the art can make various improvements and modifications without departing from the principle of the present disclosure, and such improvements and modifications fall within the protection scope of the present disclosure.

What is claimed is:

1. A method for transmitting downlink data, comprising:
generating, by a base station, on reception of downlink traffic data sent by a core network to a user equipment in a light connection (LC) state, a triggering message based on an identifier of the user equipment in the LC state; and
controlling, by the base station, based on the triggering message, the user equipment in the LC state to recover to a connection state;
wherein the generating the triggering message based on the identifier of the user equipment in the LC state comprises: generating, based on the identifier of the user equipment in the LC state, an enhanced paging message comprising the identifier of the user equipment in the LC state;
wherein the generating, based on the identifier of the user equipment in the LC state, the enhanced paging message comprising the identifier of the user equipment in the LC state comprises: scrambling a downlink control channel using the identifier of the user equipment in the LC state as a scramble code, to generate the enhanced paging message; or, taking the identifier of the user equipment in the LC state as a content of a downlink shared channel, scrambling a downlink control channel using a preset scramble code, and performing a scheduling through the scrambled downlink control channel, to generate the enhanced paging message.

2. The method for transmitting the downlink data according to claim 1, wherein after the step of controlling, based on the triggering message, the user equipment in the LC state to recover to the connection state, the method for transmitting the downlink data further comprises: sending, by the base station, the downlink traffic data to the user equipment recovered to the connection state.

3. The method for transmitting downlink data according to claim 1, wherein the step of controlling, based on the triggering message, the user equipment in the LC state to recover to a connection state comprises: sending the triggering message to the user equipment in the LC state through a downlink control channel, to recover the user equipment in the LC state from the LC state to the connection state.

4. The method for transmitting the downlink data according to claim 3, wherein the step of sending the triggering message to the user equipment in the LC state through the downlink control channel comprises:
    sending the triggering message to the user equipment in the LC state through the downlink control channel in the shorter of a configured user equipment specific discontinuous reception (DRX) cycle and a DRX cycle comprised in a system broadcast; or
    sending the triggering message to the user equipment in the LC state through the downlink control channel in a DRX cycle comprised in a system broadcast; or
    sending the triggering message to the user equipment in the LC state through the downlink control channel in a configured user equipment specific DRX cycle.

5. The method for transmitting the downlink data according to claim 1, wherein the identifier of the user equipment in the LC state is configured by:
    configuring a user equipment identifier for the user equipment in the LC state, when the base station configures the user equipment to enter the LC state; or
    reconfiguring a user equipment identifier for the user equipment in the LC state, when the user equipment in the LC state moves from a first cell region to a second cell region;
    wherein each of the first cell region and the second cell region comprises at least one cell.

6. A method for transmitting downlink data, comprising:
    receiving, by a user equipment, a triggering message that is generated by a base station when the base station receives downlink traffic data from a core network; and
    recovering, by the user equipment, from a light connection (LC) state to a connection state according to the triggering message;
    wherein the triggering message is generated by the based station based on an identifier of the user equipment in the LC state;
    wherein generating the triggering message based on the identifier of the user equipment in the LC state comprises: generating, based on the identifier of the user equipment in the LC state, an enhanced paging message comprising the identifier of the user equipment in the LC state;
    wherein generating, based on the identifier of the user equipment in the LC state, the enhanced paging message comprising the identifier of the user equipment in the LC state comprises: scrambling a downlink control channel using the identifier of the user equipment in the LC state as a scramble code, to generate the enhanced paging message; or, taking the identifier of the user equipment in the LC state as a content of a downlink shared channel, scrambling a downlink control channel using a preset scramble code, and performing a scheduling through the scrambled downlink control channel, to generate the enhanced paging message.

7. The method for transmitting the downlink data according to claim 6, wherein the step of recovering from the LC state to the connection state according to the triggering message comprises:
    determining, based on the enhanced paging message that comprises the identifier of the user equipment in the LC state and is generated by the base station on reception of the downlink traffic data from the core network, that the identifier of the user equipment in the enhanced paging message is the same as a stored identifier of the user equipment, initiating an air interface connection directly, to recover from the LC state to the connection state.

8. A base station, comprising:
    a processor, a memory and a transceiver, wherein
    the processor is configured to read a program in the memory to perform a process of:
        generating, on reception of downlink traffic data sent by a core network to a user equipment in a light connection (LC) state, a triggering message based on an identifier of the user equipment in the LC state; and
        controlling, based on the triggering message, the user equipment in the LC state to recover to a connection state;
    the transceiver is configured to receive and transmit data;
    the processor is further configured to manage a bus architecture and common processings; and
    the memory is configured to store data used by the processor in operation;
    wherein generating the triggering message based on the identifier of the user equipment in the LC state comprises: generating, based on the identifier of the user equipment in the LC state, an enhanced paging message comprising the identifier of the user equipment in the LC state;
    wherein generating, based on the identifier of the user equipment in the LC state, the enhanced paging message comprising the identifier of the user equipment in the LC state comprises: scrambling a downlink control channel using the identifier of the user equipment in the LC state as a scramble code, to generate the enhanced paging message; or, taking the identifier of the user equipment in the LC state as a content of a downlink shared channel, scrambling a downlink control channel using a preset scramble code, and performing a scheduling through the scrambled downlink control channel, to generate the enhanced paging message.

9. The base station according to claim 8, wherein the processor is configured to send, via the transceiver, the triggering message to the user equipment in the LC state through a downlink control channel to recover the user equipment in the LC state from the LC state to the connection state.

10. The base station according to claim 9, wherein the processor is configured to:
    send, via the transceiver, the triggering message to the user equipment in the LC state through the downlink control channel in the shorter of a configured user equipment specific discontinuous reception (DRX) cycle and a DRX cycle comprised in a system broadcast; or send, via the transceiver, the triggering message to the user equipment in the LC state through the downlink control channel in a DRX cycle comprised in a system broadcast; or send, via the transceiver, the triggering message to the user equipment in the LC state through the downlink control channel in a configured user equipment specific DRX cycle.

11. The base station according to claim 8, wherein the identifier of the user equipment in the LC state is configured by:

configuring a user equipment identifier for the user equipment in the LC state, when the base station configures the user equipment to enter the LC state; or reconfiguring a user equipment identifier for the user equipment in the LC state, when the user equipment in the LC state moves from a first cell region to a second cell region;

wherein each of the first cell region and the second cell region comprises at least one cell.

12. The method for transmitting the downlink data according to claim 1, wherein the enhanced paging message comprises an identifier of at least one user equipment in the LC state.

13. The method for transmitting the downlink data according to claim 6, wherein after the recovering of the user equipment from the LC state to the connection state, the method for transmitting the downlink data further comprises: receiving, in the connection state, the downlink traffic data sent by the base station.

14. The base station according to claim 8, wherein the enhanced paging message comprises an identifier of at least one user equipment in the LC state.

15. The base station according to claim 8, wherein the processor is further configured to send, via the transceiver, the downlink traffic data to the user equipment recovered to the connection state.

* * * * *